Jan. 13, 1925.
F. W. WEST
ANTISKID CHAIN AND FASTENER
Filed Oct. 7, 1924
1,522,990
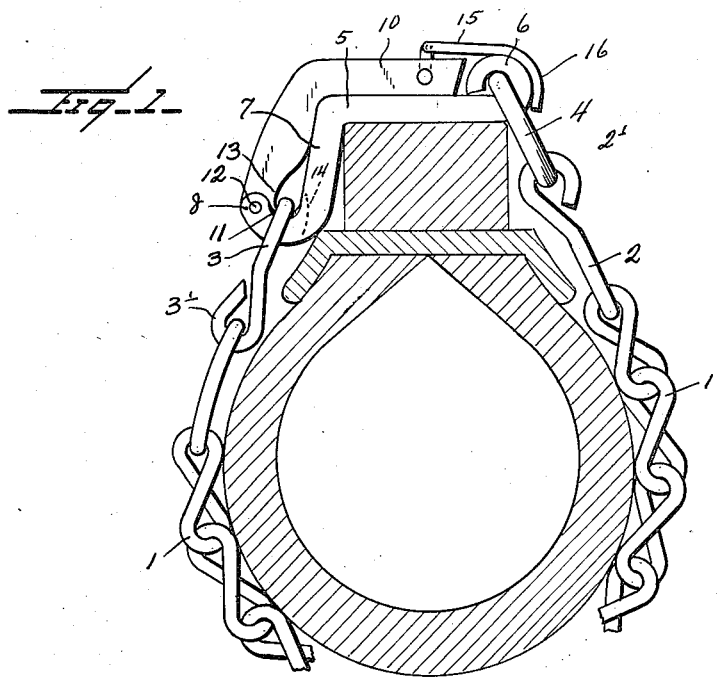
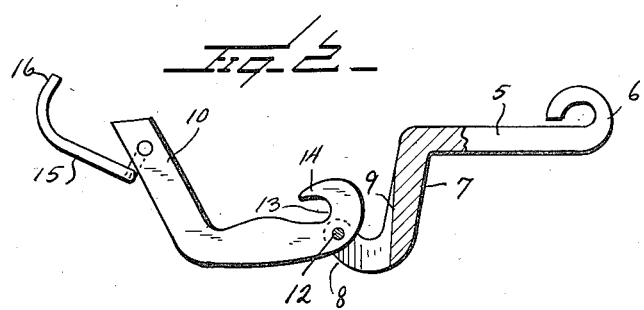
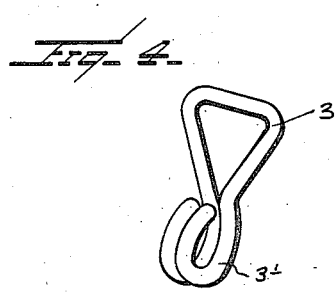
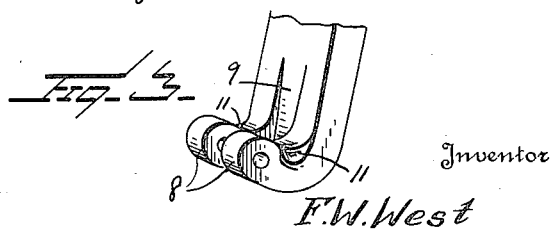
Inventor
F. W. West
By Watson E. Coleman
Attorney Patented Jan. 13, 1925.

1,522,990

UNITED STATES PATENT OFFICE.

FRANK W. WEST, OF BELLEFONTE, PENNSYLVANIA.

ANTISKID CHAIN AND FASTENER.

Application filed October 7, 1924. Serial No. 742,195.

*To all whom it may concern:*

Be it known that I, FRANK W. WEST, a citizen of the United States, residing at Bellefonte, in the county of Center and State of Pennsylvania, have invented certain new and useful Improvements in Antiskid Chains and Fasteners, of which the following is a specification, reference being had to the accompanying drawings.

This invention relates to an improved anti-skid device for use in connection with the tires of an automobile and one object of the invention is to provide an anti-skid device of the type in which a single chain is passed about the tire and rim portion of the wheel and releasably held in place by fastener means extending across the inner face of the felloe of the wheel.

Another object of the invention is to so construct this anti-skid device that the fastener for the chain will be in close engagement with the felloe and not extend from the side of the felloe beyond the plane of the sides of the tire thereby positioning the fastener so that it will be prevented from coming in contact with a curb or a rut in the road. The fastener is therefore prevented from receiving blows which could readily cause the fastener to be broken.

Another object of the invention is to so construct this fastener that the lever which holds the chain in place about the tire will be so positioned that it will be protected from contact with the sides of ruts in the road and thereby prevented from being accidentally knocked loose and releasing the anti-skid device.

Another object of the invention is to so construct this fastener that it may be cheaply made and so that it will be very strong and durable.

This invention is illustrated in the accompanying drawings, wherein:—

Figure 1 is a view showing the improved anti-skid chain in elevation and applied to a wheel indicated in section.

Figure 2 is a view showing the improved chain securing device in an open position and partially in section.

Figure 3 is a perspective view of one end portion of the saddle bar.

Figure 4 is a perspective view of one of the links or hooks connecting the chain with the fastener.

This improved anti-skid device is to be used in connection with an automobile wheel and is provided with a chain 1 which may be of any desired construction but will preferably be of the twisted link type. This chain is provided at its ends with links 2 and 3 which are formed of rod metal bent as shown to provide eyes 2' and 3', the eyes of the link 2 being engaged with a ring 4 and the eyes of the link 3 being engaged with the link at one end of the main chain 1. These links 2 and 3 serve to connect the chain with the fastener, which will now be described.

This improved fastener is designed for close engagement with the felloe of the automobile wheel and is provided with a saddle bar 5 which is formed from a strip of strong metal such as steel and has one end portion bent back upon itself to provide an eye 6 in which the ring 4 loosely fits so that the ring may have swinging movement longitudinally of the saddle bar and therefore assume the proper angle when the anti-skid device is in use. Intermediate its ends the bar is bent to provide an arm extension 7 which extends along the side face of the felloe towards the tire carrying rim and terminates in an outstanding end portion providing hinge ears 8. A groove or recess 9 is provided in the outer face of this side arm 7 between the hinge ears 8. In addition to providing hinge ears to pivotally mount the locking lever 10, these ears are further to serve as means for engaging the eye or link 3 and, therefore, they have been beveled off, as shown at 11, to provide a rounded surface which will permit the eye 3 to have rocking movement transversely on these ears without catching and without being subjected to unnecessary wear.

The locking lever 10 is formed of a strip of strong metal such as steel and has one end portion pivotally mounted between the ears 8 by means of a pivot pin 12. Adjacent its pivoted end the lever has been provided with a notch or recess 13 which leads from the inner edge of the lever and longitudinally of the lever towards the point of pivotal mounting. The recess further provides a bill 14 which is intended to seat in the groove 9 when the lever is swung to the locking position. It should be noted that this recess is so cut that when the lever is in the locking position the inner face of the bill terminates flush with the inner edges of the rounded portions 11 of the ears 8 and therefore the eye or link 3 may fit in the recess 13 and bear upon the bill 14 and bearing ears 8. This removes the strain from the pivot pin and further permits the pull of the chain upon the bill 14 to serve as means for assisting in retaining the lever in the locking or securing position. This lever is bent intermediate its ends so that the lever may conform to the shape of the saddle plate and have close fitting engagement with the arm and body portion of this plate when in the operative position. When in this operative position the free end of the lever terminates close to the eye 6 so that the eye will prevent stones or pieces or hard dirt from striking the free end of the lever and accidentally knocking the lever to a releasing position. As additional means for releasably securing the lever in the operative position, there has been provided a latch 15 formed of resilient wire pivotally mounted in an opening formed in the free end portion of the lever. This latch extends longitudinally of the lever and beyond the free end thereof and is provided with a bill 16 to be snapped into engagement with the eye 6.

When this device is in use, the chain is passed about the tire and the saddle plate brought into engagement with the felloe so that the body of the saddle plate extends across the felloe and the arm 7 is in close engagement with a side face of the felloe. The lever is swung to the inoperative position and the eye 3 passed over this lever and moved as far as possible towards the point of pivotal mounting for the lever. The lever can then be swung to the operative position and as it moves towards the operative position the chain will be drawn upon so that it is drawn tightly about the tire and moves into the proper position for resting in the recess 13 and engaging the ears 8. The lever will fit in close engagement with the arm and body portion of the saddle plate with its end close to the eye 6 and the latch 15 can then be swung to the operative position so that it snaps over the eye 6 and serves to securely but releasably hold the lever in the operative position. The anti-skid device will therefore be firmly held in place about the tire until no longer needed and the latch can then be released and the lever swung to the inoperative position so that the eye 3 may be slid off of the lever and the anti-skid device removed from engagement with the tire. It will, of course, be understood that as many of these anti-skid devices may be placed about the tire as desired.

What is claimed is:—

1. An anti-skid device comprising a chain, and means for fastening the chain about a tire and wheel felloe, said fastener comprising a saddle bar for extending across a wheel felloe and having one end portion bent to provide an arm extending along the side of the felloe towards the tire and provided with outwardly projecting hinge ears, the other end portion of the saddle bar being formed into an eye, a chain engaging member mounted in the eye for swinging movement longitudinally of the saddle bar, a chain securing lever pivotally mounted between the hinge ears and having a chain receiving recess adjacent its pivoted end, the lever being bent intermediate its ends for close engagement with the saddle bar and arm thereof when swung to a locking position, and a latch carried by the free end portion of the lever for engaging the eye of the saddle bar and securing the lever in a locking position.

2. A securing device for an anti-skid chain comprising a bar bent intermediate its ends to provide an arm extension, the arm extension having an outstanding end portion forming hinge means and the other end portion of the bar being formed into an eye for loosely receiving a chain engaging member, a chain securing lever having one end portion pivotally connected with said hinge means and provided with a chain receiving recess leading from its inner edge face and longitudinally of the lever the point of pivotal mounting, said lever being bent intermediate its ends to conform to the contour of the bar and have close engagement therewith when in an operative position, said lever when in operative position having the free end thereof positioned close to the eye at the end of the bar and a resilient latching hook carried by the free end of the lever and adapted to snap over the eye to securely hold the lever in operative position.

In testimony whereof I hereunto affix my signature.

FRANK W. WEST.